United States Patent
Suzuki et al.

(10) Patent No.: US 6,810,188 B1
(45) Date of Patent: Oct. 26, 2004

(54) COATED OPTICAL FIBER

(75) Inventors: Atsushi Suzuki, Yokohama (JP);
Tomoyuki Hattori, Yokohama (JP);
Kazunori Tanaka, Yokohama (JP);
Toshifumi Hosoya, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 283 days.

(21) Appl. No.: 10/111,768

(22) PCT Filed: Nov. 2, 2000

(86) PCT No.: PCT/JP00/07756
§ 371 (c)(1),
(2), (4) Date: Apr. 29, 2002

(87) PCT Pub. No.: WO01/35143
PCT Pub. Date: May 17, 2001

(30) Foreign Application Priority Data

Nov. 5, 1999 (JP) ............................................ 11-315131

(51) Int. Cl.[7] .............................. G02B 6/02; G02B 6/22
(52) U.S. Cl. ...................................... 385/128; 385/127
(58) Field of Search ................................ 385/127, 128; 427/163.1

(56) References Cited

U.S. PATENT DOCUMENTS 4,962,992 A * 10/1990 Chapin et al. ............... 385/102

FOREIGN PATENT DOCUMENTS

| JP | 9-5587 A | 1/1997 |
| JP | 11-116282 | 4/1999 |
| JP | 2000-155248 | 6/2000 |
| JP | 2000-292661 | 10/2000 |
| WO | WO98/31642 | 7/1998 |

OTHER PUBLICATIONS

"Properties of UV–Curable Polyurethan Acrylates for Primary Optical Fiber Coating", Han Do Kim et al., Journal of Applied Polymer Science, Vo. 46, No. 8, Nov. 15, 1992, pp. 1339–1351.

* cited by examiner

*Primary Examiner*—Diane I. Lee
*Assistant Examiner*—Lisa M. Caputo
(74) *Attorney, Agent, or Firm*—McDermott Will & Emery LLP

(57) ABSTRACT

A coated optical fiber is shown in which, by coating a glass optical fiber with a primary coating having a storage modulus E' of 0.01 kg/mm$^2$ to 2.0 kg/mm$^2$ at 25° and 110 Hz and an adhesion of 10 g/cm to 200 g/cm to the glass optical fiber, delamination at the interface between the glass optical fiber and the primary coating, and voids are prevented during and after the production, for example, on the line during drawing and winding. An optical fiber ribbon of the present invention, which is formed by collectively coating the coated optical fibers each including a primary coating with a storage modulus E' of 0.01 kg/mm$^2$ to 0.5 kg/mm$^2$ and an adhesion of 10 g/cm to 100 g/m, has a high delamination resistance and a good collective strippability of coatings. In an optical fiber unit of the present invention which is formed by collectively coating the coated optical fibers having a storage modulus E' of 0.01 kg/mm$^2$ to 0.5 kg/mm$^2$ and an adhesion of 100 g/cm to 200 g/cm, delamination and voids will not occur.

10 Claims, 4 Drawing Sheets

COATED OPTICAL FIBER

CROSS-REFERENCES TO RELATED APPLICATIONS

This application is a 371 of PCT/JP00/07756 filed 2 Nov. 2000, which claims priority to Japanese application 11-315131, filed 5 Nov. 1999.

TECHNICAL FIELD

The present invention relates to a coated optical fiber, an optical fiber ribbon, and an optical fiber unit.

BACKGROUND ART

An optical fiber is obtained by drawing an optical fiber preform having at least a core and a cladding. Immediately after drawing, a coating is formed around the outside of the glass optical fiber in order to protect and reinforce the fiber and to give it flexibility, and for other purposes. It is known to form at least two layered coatings, namely, a relatively soft (low Young's modulus) primary coating which is in contact with the outer circumference of the glass optical fiber and which has a buffering function, and a hard (high Young's modulus) secondary coating formed on the outermost side and having a protective function.

For example, a coated optical fiber is proposed in Japanese Patent Application Laid open No. 9-5587, in which, by setting the extraction force (the force necessary to pull a glass optical fiber out of the coated optical fiber which is fixed from the outside), which force serves as the adhesion between the glass optical fiber and the primary coating material forming the primary coating, at 90 g/mm to 180 g/mm, an adequate adhesion between the glass optical fiber and the primary coating material is obtained, and partial delamination will not occur at the interface between the glass optical fiber and the primary coating material even when they are soaked in water for a long period.

However, when the extraction force corresponding to the adhesion between the glass optical fiber and the primary coating material is set at 90 g/mm to 180 g/mm as described in the above publication, delamination sometimes occurs at the interface between the glass and the coating material in the coated optical fiber during or after the production of the coated optical fiber: for example, during the period from drawing to cabling of the optical fiber or during winding onto another bobbin. It is thought that minute foreign materials such as chips of the optical fiber, adhering onto a pulley, on which the coated optical fiber travels, due to static electricity or the like cause the coated optical fiber to undergo large local deformation, and as a result, delamination occurs at the interface between the glass optical fiber and the primary coating.

An object of the present invention is to provide a coated optical fiber in which such delamination during the period from drawing to cabling is prevented.

A tapelike (ribbonlike) cable, which is formed by placing a plurality of coated optical fibers in parallel in a plane and by forming a unitary jacket around the coated optical fibers so as to coat them therein, is referred to as an "optical fiber ribbon". When connecting optical fiber ribbons, it is necessary to collectively remove the layers: the primary coating formed around the outside of the glass optical fiber, and the unitary jacket. This operation is referred to as "collective stripping of coatings". In this case, it is undesirable that the coatings such as the primary coating or secondary or other coatings remain on the surface of the glass optical fiber.

Another object of the present invention is to provide a coated optical fiber which has an improved delamination resistance during drawing and rewinding and whose collective strippability of coatings is not degraded when it is used as a component of an optical fiber ribbon.

A further object of the present invention is to provide a coated optical fiber which is assembled into a certain type of optical fiber unit or inserted into a loose tube and is subjected to stripping of individual coated fiber when connection is performed and in which the delamination resistance is increased and stripping of individual coated fiber is easy.

A still further object of the present invention is to provide an optical fiber ribbon in which the delamination resistance is increased and the collective stripping of coatings is easy, or an optical fiber unit in which the delamination resistance is increased and stripping of individual coated fiber is easy.

DISCLOSURE OF INVENTION

In order to achieve the above objects, the present invention relates to:

(1) A coated optical fiber having at least one coating formed around the outside of a glass optical fiber, wherein the storage modulus E' of the primary coating in contact with the glass optical fiber is within the range of 0.01 kg/mm$^2$ to 2.0 kg/mm$^2$ at 25° C. and 110 Hz, and the adhesion between the glass optical fiber and the primary coating is within the range of 10 g/cm to 200 g/cm.

(2) A coated optical fiber according to (1) above, wherein the storage modulus E' is within the range of 0.01 kg/mm$^2$ to 0.5 kg/mm$^2$ and the adhesion is within the range of 10 g/cm to 100 g/cm.

(3) A coated optical fiber according to (1) above, wherein the storage modulus E' is within the range of 0.01 kg/mm$^2$ to 2.0 kg/mm$^2$ and the adhesion is within the range of 100 g/cm to 200 g/cm.

(4) A coated optical fiber according to any of (1) to (3) above, wherein the primary coating is made of ultraviolet curable resin.

(5) An optical fiber ribbon wherein a plurality of coated optical fibers according to any of (1), (2), and (4) above are arranged in parallel and are collectively coated with a unitary resin jacket.

(6) An optical fiber unit wherein a plurality of coated optical fibers according to any of (1), (3), and (4) above are arranged and are collectively coated with a unitary resin jacket.

BEST MODE FOR CARRYING OUT THE INVENTION

The present inventors have found that regarding delamination the storage modulus E' of a primary coating and the adhesion between a glass optical fiber and the primary coating is correlated with the frequency of delamination, and thus achieved the present invention.

Figure 2:
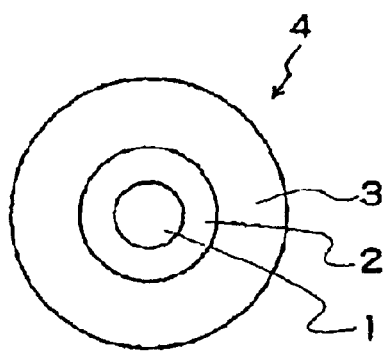
FIG. 2 is a schematic sectional view showing an example of a coated optical fiber according to the present invention.

FIG. 2 is a schematic sectional view of an example of the present invention. A primary coating 2, which has a storage modulus E' of 0.01 kg/mm² to 0.5 kg/mm² at 25° C. and at a frequency of 110 Hz, is formed around the outside of a glass optical fiber 1 having at least a core and a cladding, the adhesion between the primary coating 2 and the glass optical fiber 1 is 10 g/cm to 100 g/cm, and a secondary coating 3 is formed around the outside of the primary coating 2, thereby constructing a coated optical fiber 4.

In the present invention, the storage modulus E' is obtained by performing a calculation according to the following Equation (1), based on an out-of-phase sinusoidal stress $S=S_0 \exp[i(\omega t+\delta)]$ which is detected at one end of a sample when a sinusoidal strain $r=r_0 \exp(i\omega t)$ is applied as mechanical vibration to the other end:

$$E^* = S/r$$
$$= S_0 \exp[i(\omega t+\delta)]/r_0 \exp(i\omega t)$$
$$= S_0/r_0 \cdot \cos\delta + iS_0/r_0 \cdot \sin\delta$$
$$= E' + i \cdot E''$$

where E* represents the complex viscoelasticity, E' represents the storage modulus, E" represents the loss viscoelasticity, S represents the stress, $S_0$ represents the amplitude of the stress, r represents the strain, $r_0$ represents the amplitude of the strain, ω represents the angular velocity, t represents the time, and δ represents the phase shift angle.

In Eq. (1), δ is a function of ω. In a quasi-static state, that is, when ω is 0, δ is 0, E" is 0, and the storage modulus E' corresponds to the so-called Young's modulus.

A description will be given to explain why the storage modulus E' of the primary coating resin serves as an index in the present invention.

In drawing of an optical fiber, a coated optical fiber is wound onto a bobbin via some pulleys. When static electricity or the like causes foreign materials to adhere to portions of the pulleys where the optical fiber travels, delamination sometimes occurs at the interface between the glass and the coating. Since the coated optical fiber is produced at high speed, the pulleys are also rotated at high speed, and strain is rapidly applied to the coating, that is, at a high strain rate.

Conventionally, the Young's modulus of the coating is measured based on "the stress applied to extend the coating by 2.5% at a low strain rate of approximately 1 mm/min". The Young's modulus found from the gradient of a line which links a stress corresponding to a strain of 0 and a stress corresponding to a strain of 2.5% is referred to as "2.5% secant Young's modulus". From the viewpoint of measurement, this Young's modulus is used instead of the Young's modulus at the origin where the strain is 0. However, the present inventors have considered that it is more appropriate to use the storage modulus E' as the index, which is the real part of the elastic modulus in a high strain rate region, as opposed to using the Young's modulus measured at a low strain rate which has been used in this technical field, such as the 2.5% secant Young's modulus, because the resin used for the primary coating or the like exhibits viscoelastic behavior, and have performed investigations.

As a result, the present inventors found that there was a correlation between the storage modulus E' at 25° C. and 110 Hz and the frequency of delamination, which can be used for an index of elastic modulus in the high strain rate region.

In the present invention, the adhesion is expressed as the force necessary to separate a primary coating from a glass plate by 50 mm in a 180°-direction at a pulling rate of 200 mm/min after the primary coating is formed on the surface of the glass plate. A more precise definition thereof will be provided in the following examples.

Figure 1:
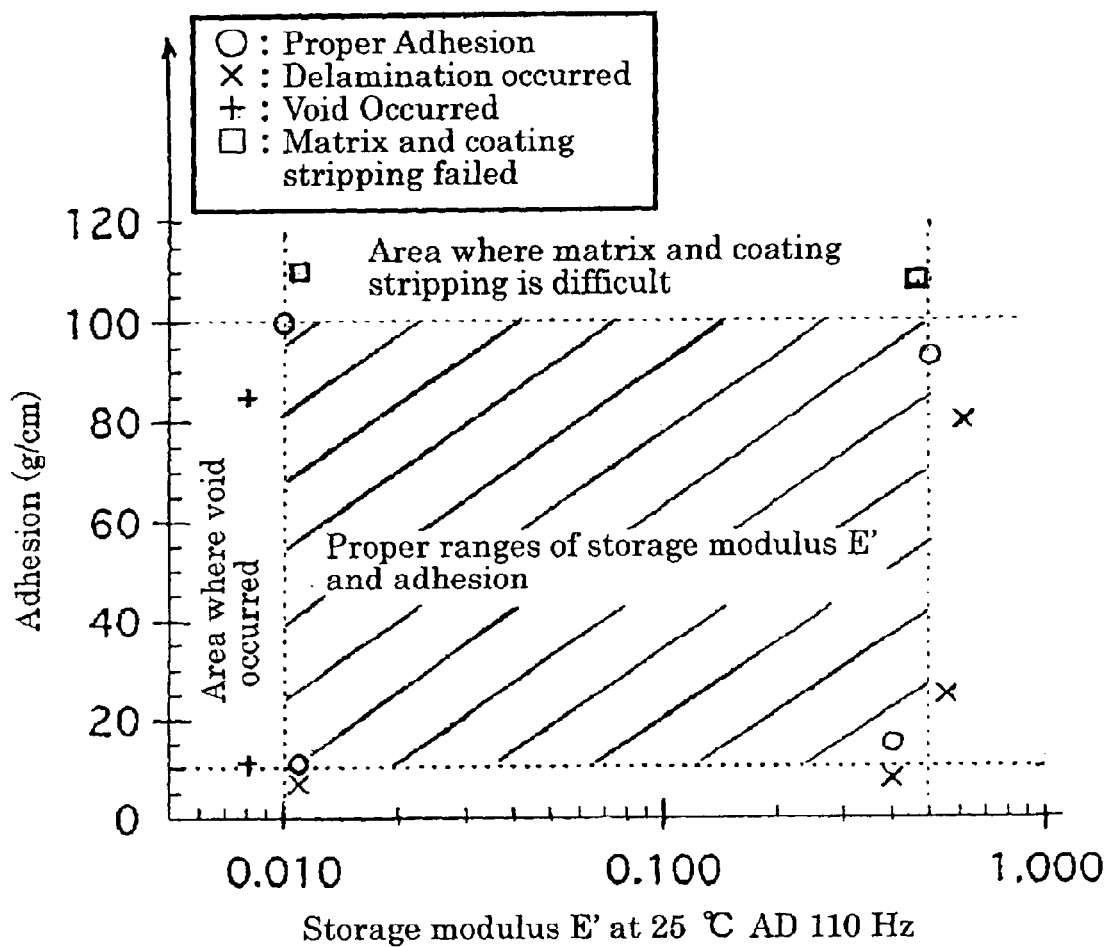
FIG. 1 is a graph showing the correlation among delamination, the storage modulus E' of a primary coating, and the adhesion (between glass and the primary coating), and the collective strippability of coatings of an optical fiber ribbon.

FIG. 1 is a graph which, based on the results of the following examples of the present invention, shows the proper ranges of the storage modulus E' (25° C., 110 Hz) of a primary coating of an optical fiber ribbon according to the present invention, and the adhesion between a glass optical fiber and the primary coating. As shown in FIG. 1, when the storage modulus E' of the primary coating at 25° C. and 110 Hz is within the range of 0.01 kg/mm² to 0.5 kg/mm² and the adhesion is within the range of 10 g/cm to 100 g/cm, delamination does not occur at the interface between the glass optical fiber and the primary coating, and productivity and reliability of the coated optical fiber are improved.

When the storage modulus E' of the primary coating is less than 0.01 kg/mm², the primary coating is prone to internal rupture (voids) during handling. Since the voids increase the transmission loss, for example, in a low-temperature environment at −40° C., the formation of voids must be prevented.

In contrast, when the storage modulus E' exceeds 0.5 kg/mm² in the coated optical fiber of the optical fiber ribbon, delamination is prone to occur at the interface between the glass optical fiber and the primary coating. It is supposed that, when the elastic modulus at a high strain rate is too high, a large stress is produced at the interface between the glass optical fiber and the primary coating when the coated optical fiber is deformed, causing the likelihood of delamination to occur. A particularly preferable storage modulus E' is within the range of 0.02 kg/mm² to 0.3 kg/mm² at 25° C. and 110 Hz.

Delamination at the interface can be prevented by increasing the adhesion between the glass optical fiber and the primary coating. When the adhesion is excessively strong, however, the collective stripping of coatings is difficult when connecting the optical fiber ribbon to other glass optical fibers. Therefore, it is preferable that the adhesion be less than or equal to 100 g/cm. In contrast, when the adhesion is less than 10 g/cm, delamination at the interface between the glass optical fiber and the primary coating is likely to occur. A particularly preferable adhesion is within the range of 15 g/cm to 75 g/cm.

Not all of the optical fibers are formed into a ribbon, but the optical fibers may be assembled into a tight unit or may be inserted in a loose tube. In these cases, it is only necessary to take stripping of individual coated fiber into consideration. In such cases, both the storage modulus E' and the adhesion between the glass optical fiber and the primary coating can be made stronger than those in the above-described coated optical fiber for the fiber ribbon, and this can increase the delamination resistance.

Figure 4:
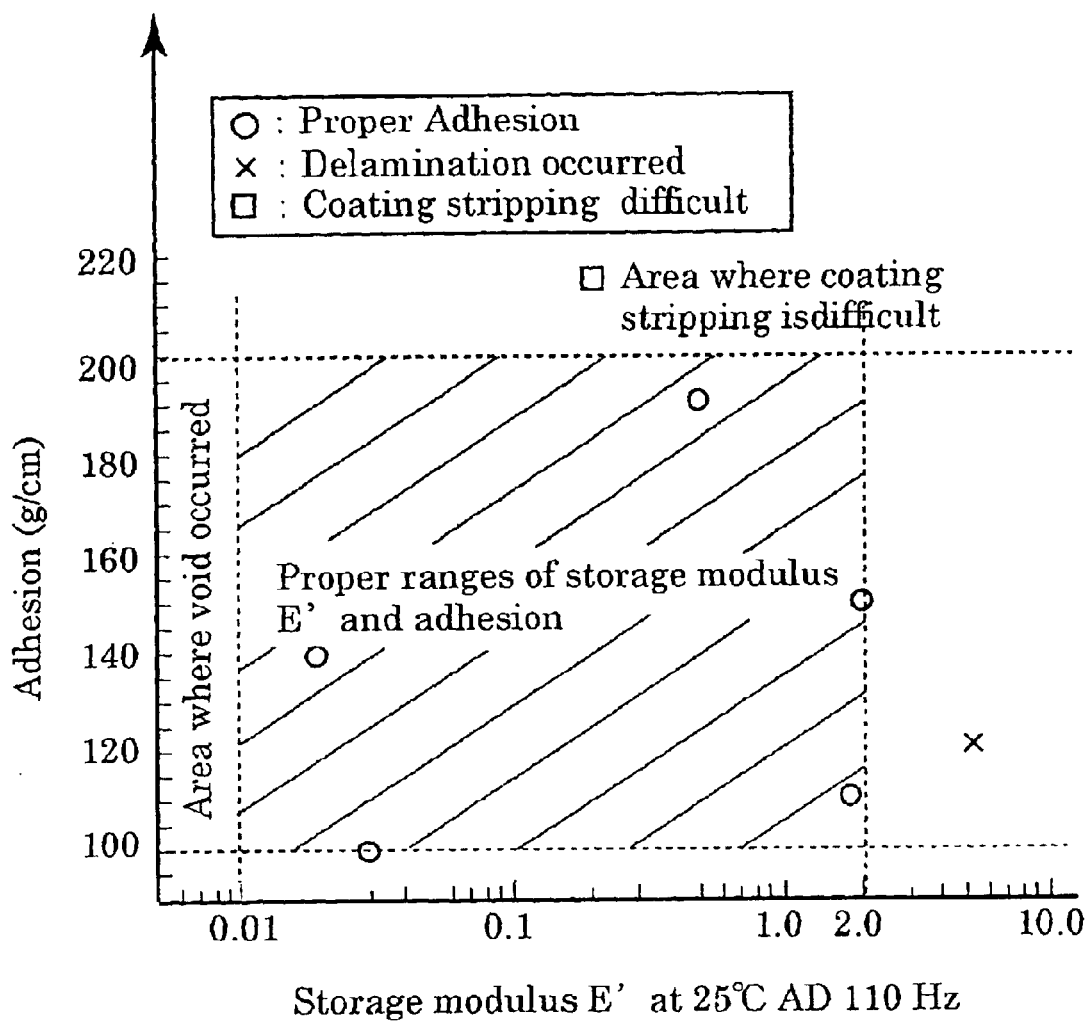
FIG. 4 is a graph showing the correlation among delamination, the storage modulus E' of the primary coating, and the adhesion (between glass and the primary coating), and the coating strippability.

FIG. 4 is a graph which shows, based on the results of the following examples of the present invention, a region in which the storage modulus E' of a primary coating of a coated optical fiber and the adhesion between a glass optical fiber and the primary coating are proper and stripping of individual coated fiber is possible in a case in which it is unnecessary to take collective stripping of coatings into consideration.

As shown in FIG. 4, even when the storage modulus E' of the primary coating at 25° C. and 110 Hz is within the range of 0.01 kg/mm$^2$ to 2.0 kg/mm$^2$ and the adhesion between the glass and the primary coating is within the range of 100 g/cm to 200 g/cm, delamination does not occur at the interface between the glass and the primary coating, and therefore, productivity and reliability of the coated optical fiber are increased.

When the storage modulus E' at 25° C. and 110 Hz is less than 0.01 kg/mm$^2$, internal rupture (voids) is likely to occur in the primary coating during handling, and the transmission loss tends to increase at low temperature. When the storage modulus E' exceeds 2.0 kg/mm$^2$, delamination is likely to occur at the interface between the glass optical fiber and the primary coating.

While it is satisfactory for a minimum of the adhesion between the glass optical fiber and the primary coating to be 10 g/cm, as shown in FIG. 1, it is preferable that the adhesion be more than or equal to 100 g/cm in a case where only the strippability of stripping of individual coated fiber is to be considered, since the delamination resistance is increased. When the adhesion exceeds 200 g/cm, it is difficult to perform stripping of individual coated fiber when connecting the optical fiber to another optical fiber.

In the present invention, the composition, structure, and production method of the glass optical fiber itself are not limited specifically, and may conform to those known in this technical field.

It is only necessary for the coating material of the primary coating in the present invention to satisfy the storage modulus E' and the adhesion of the present invention. While the coating material is, for example, a (metha)acrylate resin, such as urethane (metha)acrylate resin, polybutadiene (metha)acrylate resin, polyether (metha)acrylate resin, polyester (metha)acrylate resin, or epoxy (metha)acrylate resin; an unsaturated polyester; a cation-polymerized epoxy resin; an allylic compound resin; or an ultraviolet-curable resin consisting of a mixture of the resins, it is not limited thereto. These resins may be a composite resin containing various components, and, for example, various kinds of reactive monomers, a polymerization initiator, and various kinds of additives, such as a chain-transfer agent, an anti-oxidizing agent, a photostabilizer, a plasticizer, a silane coupling agent, a polymerization-inhibitor, a sensitizing agent, and a slip additive, may be added thereto as necessary. In the present invention, resin and composite resin are generically referred to as "resin".

It is necessary to select, as the primary coating in the present invention, a material having a storage modulus E' and an adhesion to the glass optical fiber which are within the ranges specified in the invention, as described above.

The storage modulus E' of the primary coating can be adjusted by the molecular weight of polyether in an oligomer which makes up the skeleton of the resin serving as the coating material, and the type of reactive diluent monomer. That is, the storage modulus E' can be increased, for example, by reducing the molecular weight of polyether, increasing the blending amount of a polyfunctional monomer, or selecting a monomer with high rigidity.

Furthermore, the storage modulus E' can be increased by arranging for the composition to contain many benzene rings with high rigidity, or the like.

The adhesion between the glass optical fiber and the primary coating can be adjusted by changing the content of an adhesive monomer in the coating material serving as the primary coating, and the additive rate (including 0) of the silane coupling agent. The adhesive monomer is, for example, isobornyl acrylate, acrylamide, N-vinylpyrrolidone, or acryloyl morpholine.

While the secondary coating formed around the outside of the primary coating, and subsequent coatings are not specifically limited in the present invention, coatings, which have a Young's modulus higher than that of the primary coating, for example, approximately 50 kg/mm$^2$ to 150 kg/mm$^2$, and which function as a protective layer are preferable. While a resin similar to the primary coating may be used as the material of the coatings, a colored optical fiber may be formed by, for example, adding a coloring agent to the outermost layer.

There are no limitations to the method of forming the coatings, such as the primary coating and the secondary coating, immediately after drawing the optical fiber, and the method may conform to a method well known in this technical field. For example, in the case of an energy curable resin which is curable with, for example, heat or light, a coating is formed by curing the coating material by radiation of the corresponding energy. The use of an ultraviolet-curable resin has the advantage of shorter curing time.

In the case in which the coated optical fiber of the present invention is also provided with a unitary jacket so as to form an optical fiber ribbon, delamination on the production line is reduced, and collective strippability of coatings thereof is enhanced as compared with conventional products.

Figure 3:
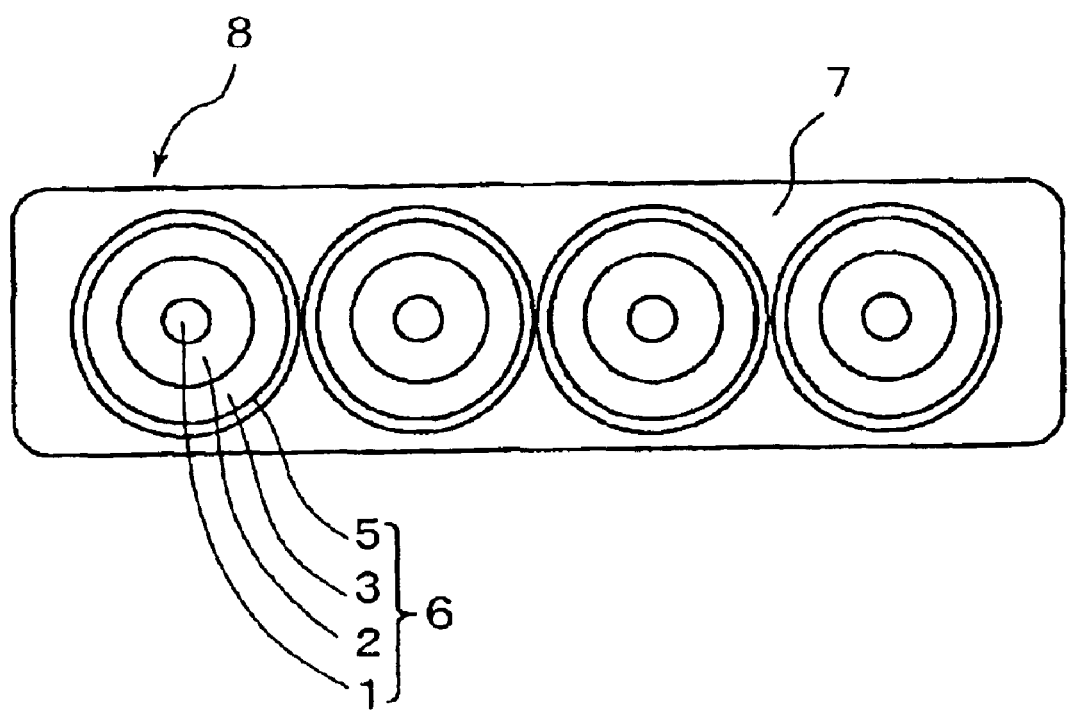
FIG. 3 is a schematic sectional view showing the structure of an optical fiber ribbon using the coated optical fiber of the present invention shown in FIG. 1.

FIG. 3 is a schematic sectional view showing a example of an optical fiber ribbon 8 formed by placing a plurality of colored fibers 6, in each of which a colored layer 5 is formed around the outside of the coated optical fiber 4 shown in FIG. 2, in parallel, and collectively coating the colored fibers 6 with a unitary jacket 7.

In general, for example, an ultraviolet-curable resin, which is similar to the primary coating and the secondary coating and has a Young's modulus of, for example, approximately 50 kg/mm$^2$ to 150 kg/mm$^2$, is used as the unitary jacket material of the optical fiber ribbon. The jacket may be formed by a well-known method.

Figure 5:
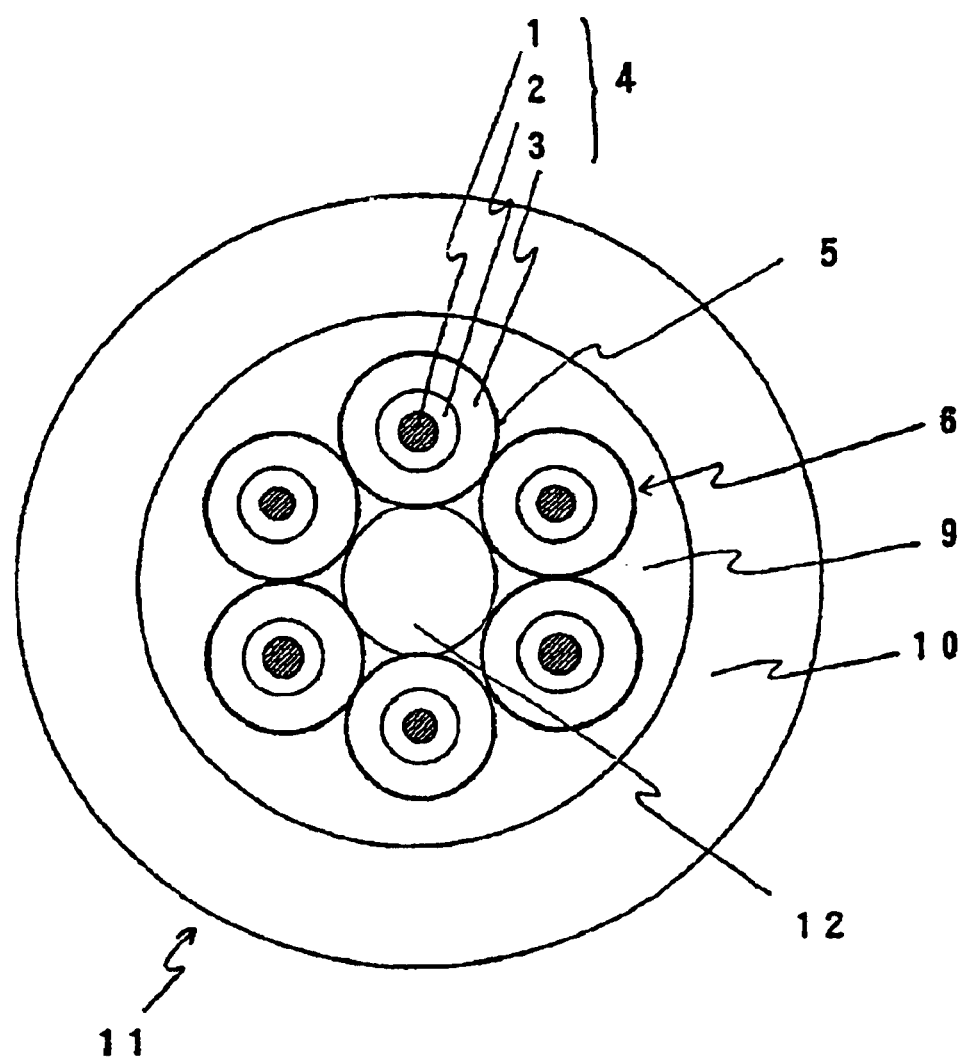
FIG. 5 is a schematic sectional view showing an example of an optical fiber unit using the coated optical fiber of the present invention shown in FIG. 1.

FIG. 5 shows a concrete example of a structure of an optical fiber unit 11 formed by bundling a plurality of colored fibers 6, in which a colored layer 5 is formed around the outside of each of the coated optical fibers 4, around a center tension member 12, and collectively coating the colored fibers 6 with unitary jackets 9 and 10. Various structures other than those illustrated above are well known. The material of the unitary jackets may be a resin similar to that of the above-described optical fiber ribbon. The jackets may be formed by a well-known method.

EXAMPLES

While examples of the present invention will be described below in detail, the present invention is not limited thereto.

Examples 1 to 4, Comparative Examples 1 to 4, and Comparative Examples 1' to 4

When producing a two-layers coated optical fiber in which a primary coating was formed around the outside of a quartz glass optical fiber having an outer diameter of 125 μm so as to obtain an outer diameter of 200 μm, and a secondary coating was formed therearound so as to obtain an outer diameter of 240 μm, a relatively soft photo-curable urethane acrylate resin was used as the material of the primary coating, and a relatively hard photo-curable urethane acrylate resin was used as the secondary coating.

In order to adjust the adhesion, resins were prepared as the material of the primary coating, in which a polar monomer (for example, acrylamide, N-vinylpyrrolidone, or acryloyl morpholine) or a silane-coupling agent was contained at different rates.

First, tests were conducted to measure the storage modulus E' of the primary coating materials and the adhesion thereof to glass which was the same material as that of the glass optical fiber.

Regarding the measurement of the storage modulus E', each of the primary coating materials was formed into the shape of a sheet and was irradiated with 1000 mJ/cm² of ultraviolet light [the amount of light was measured by using a UV meter UV-M10 (spectral sensitivity UV-35) manufactured by Ohku Seisakusho] using a mercury lamp (a metal halide lamp M015-L312 manufactured by Eye Graphics) in a nitrogen atmosphere, thereby obtaining a sheet having a thickness of 200 μm. A sample having a width of 4 mm, a length of 20 mm, and a thickness of 200 μm was cut from the sheet, and the storage modulus E' of the sample was measured at a frequency of 110 Hz with a vibration displacement of 0.016 mm by using Rheo-Vibron (manufactured by Orientic Corporation) as an elastomer.

The adhesion was measured by the following procedure:

(1) By soaking a quartz glass plate (200 mm by 150 mm) in sulfuric acid for more than five minutes, the surface thereof was cleaned.

(2) A resin liquid for forming the primary coating was applied onto the cleaned quartz glass plate, was irradiated with 100 mJ/cm² of ultraviolet light by using the same mercury lamp as described above, and was thereby cured. As a result, a sample was obtained in which the cured resin layer had a thickness of 200 μm, a width of 50 mm, and a length of 170 mm.

(3) Obtained samples were left in an atmosphere at 25° C. and at 50% RH for one week.

(4) Next, the resin layer of each sample was peeled off the quartz glass plate by 50 mm at a pulling rate of 200 mm/min in the 180°-direction. The maximum force (g/cm per unit width) required in this case was defined as the adhesion between the glass optical fiber made of the same material and the primary coating resin, and was regarded as the adhesion between the glass optical fiber and the primary coating.

A primary coating was formed around the outside of a quartz glass optical fiber having an outer diameter of 125 μm so as to obtain an outer diameter of 200 μm, and a secondary coating was formed therearound so as to obtain an outer diameter of 240 μm. Primary coatings were formed so as to have various combinations of the adhesion to the glass optical fiber and the storage modulus E' shown in Table I according to the above test results, and coated optical fibers were produced at a drawing rate of 200 m/min using one UV furnace F-10, manufactured by Fusion UV Systems, Inc. for curing both the primary coating and the secondary coating After the production, the coated optical fiber was unreeled from the take-up bobbin, and was soaked in a matching oil the refiactive index of which is adjusted to be equal to that of the coating (if it is not soaked in the matching oil, the observation of the interface between the glass optical fiber and the coating is impossible), and was observed at 50× magnification by an optical microscope from the direction of the side face of the coated optical fiber. It was determined that the cases in which voids and delamination did not occur at all were acceptable.

Evaluations of Collective Strippability of Coatings:

A fiber ribbon was produced by using the obtained coated optical fiber, and the coatings of the fiber ribbon were manually and collectively stripped by a heating remover JR-4A (trade name, manufactured by Sumitomo Electric Industries, Ltd.). It was determined that the cases in which the coatings could be removed from the surface of the glass optical fiber at a heating temperature of 90° C. were acceptable. When the adhesion between the glass optical fiber and the coating was too strong, the coating could not be stripped from the glass optical fiber.

The above results are shown in Table I and FIG. 1.

TABLE I

| Sample | E' (kg/mm²) | Adhesion (g/cm) | Observation of side face | | Collective strippability of fiber ribbon |
|---|---|---|---|---|---|
| | | | Delamination | Void | |
| Example 1 | 0.011 | 11 | None found | None found | o |
| Comparative example 1 | 0.011 | 7 | Found | None found | o |
| Comparative example 1' | 0.008 | 11 | None found | Found | o |
| Example 2 | 0.4 | 15 | None found | None found | o |
| Comparative example 2 | 0.4 | 8 | Found | None found | o |
| Comparative example 2' | 0.55 | 25 | Found | None found | o |
| Example 3 | 0.01 | 100 | None found | None found | o |
| Comparative example 3 | 0.008 | 85 | None found | Found | o |
| Comparative example 3' | 0.011 | 110 | None found | None found | x |
| Example 4 | 0.5 | 93 | None found | None found | o |
| Comparative example 4 | 0.61 | 80 | Found | None found | o |
| Comparative example 4' | 0.46 | 108 | None found | None found | x |

In FIG. 1, the horizontal axis represents the storage modulus E' (kg/mm²), the vertical axis represents the adhesion (g/cm) between the glass and the primary coating, "o" represents proper adhesion (no delamination, no void, and good collective strippability of coatings) in the examples of the present invention, "x" shows that delamination occurred, "+" represents that voids occurred, and "□" shows that-collective stripping of coatings of the fiber ribbon failed. In the figure, the diagonally shaded area represents a region where the storage modulus E' and the adhesion are proper. It is shown that delamination and voids do not occur and the collective strippability of coatings is high when the storage modulus E' and the adhesion are within the range of the present invention.

Examples 5 to 9 and Comparative Examples 5 and 6

In a manner similar to that of Example 1 described above, coated optical fibers were produced in which the storage modulus E' and the adhesion between the glass and a primary coating were different, as shown in Table II (Examples 5 to 9, and Comparative Examples 5 and 6). The obtained coated optical fibers were tested for delamination and voids, in a manner similar to that of Example 1, and further, the coating strippabilities thereof were evaluated as follows. The results are shown in Table II and FIG. 4.

Evaluations of Coating Strippability:

The coating of the coated optical fiber was stripped by using a coating stripper "No-Nick NN203" (trade name, manufactured by Clauss Inc.). It was determined that stripping of individual coated fiber was difficult in the cases in which the coating could not be stripped off the glass optical fiber, and the cases are marked with "x" in Table II. In Table II, "o" means that signal stripping of individual coated fiber is easy.

TABLE II

| Sample | E' (kg/mm$^2$) | Adhesion (g/cm) | Observation of side face | | Fiber ribbon coating strippability |
|---|---|---|---|---|---|
| | | | Delamination | Void | |
| Example 5 | 2.0 | 150 | None found | None found | o |
| Example 6 | 1.8 | 110 | None found | None found | o |
| Example 7 | 0.5 | 190 | None found | None found | o |
| Example 8 | 0.03 | 100 | None found | None found | o |
| Example 9 | 0.02 | 140 | None found | None found | o |
| Comparative example 5 | 5.0 | 120 | Found | None found | o |
| Comparative example 6 | 0.2 | 215 | None found | None found | x |

In FIG. 4, the horizontal axis represents the storage modulus E' (kg/mm$^2$), the vertical axis represents the adhesion (g/cm) between the glass and the primary coating, "o" represents proper adhesion (no delamination, no void, and good coating strippability) in the examples of the present invention, "x" shows that delamination occurred, and "□" shows that stripping of individual coated fiber of the coated optical fiber failed. In the figure, the diagonally shaded area represents a region where the storage modulus E' and the adhesion are proper. It is shown that delamination and voids do not occur and the coating strippability is high when the storage modulus E' and the adhesion are within the range of the present invention.

INDUSTRIAL APPLICABILITY

As described above, according to the present invention, the delamination resistance of the coated optical fiber was increased, the problem of delamination during drawing and winding processes can be solved, and the occurrence of voids is prevented inside the coating. This enhances the productivity and quality of the coated optical fiber.

In the optical fiber ribbon using the coated optical fibers of the present invention, collective strippability of coatings is enhanced, and the working efficiency in, for example, the connection to other optical fibers can be improved.

Since the optical fiber unit using the coated optical fiber of the present invention has a high delamination resistance and allows easy stripping of individual coated fiber, the working efficiency in, for example, the connection to another optical fiber can be improved.

What is claimed is:

1. A coated optical fiber having at least one coating formed around the outside of a glass optical fiber, wherein the storage modulus E' of the primary coating in contact with said glass optical fiber is within the range of 0.01 kg/mm$^2$ to 2.0 kg/mm$^2$ at 25° C. and 110 Hz, and the adhesion between said glass optical fiber and said primary coating is within the range of 10 g/cm to 200 g/cm.

2. A coated optical fiber according to claim 1, wherein the storage modulus E' is within the range of 0.01 kg/mm$^2$ to 0.5 kg/mm$^2$ and the adhesion is within the range of 10 g/cm to 100 g/cm.

3. An optical fiber ribbon wherein a plurality of coated optical fibers according to claim 2, are arranged in parallel and are collectively coated with a unitary resin jacket.

4. A coated optical fiber according to claim 2, wherein said primary coating is made of ultraviolet-curable resin.

5. An optical fiber ribbon wherein a plurality of coated optical fibers according to claim 4 are arranged in parallel and are collectively coated with a unitary resin jacket.

6. A coated optical fiber according to claim 1, wherein the storage modulus E' is within the range of 0.01 kg/mm$^2$ to 2.0 kg/mm$^2$ and the adhesion is within the range of 100 g/cm to 200 g/cm.

7. An optical fiber unit wherein a plurality of coated optical fibers according to claim 6 are arranged and are collectively coated with a unitary resin jacket.

8. A coated optical fiber according to claim 6, wherein said primary coating is made of ultraviolet-curable resin.

9. An optical fiber unit wherein a plurality of coated optical fibers according to claim 8 are arranged and are collectively coated with a unitary resin jacket.

10. A coated optical fiber according to claim 1, wherein said primary coating is made of ultraviolet-curable resin.

* * * * *